UNITED STATES PATENT OFFICE.

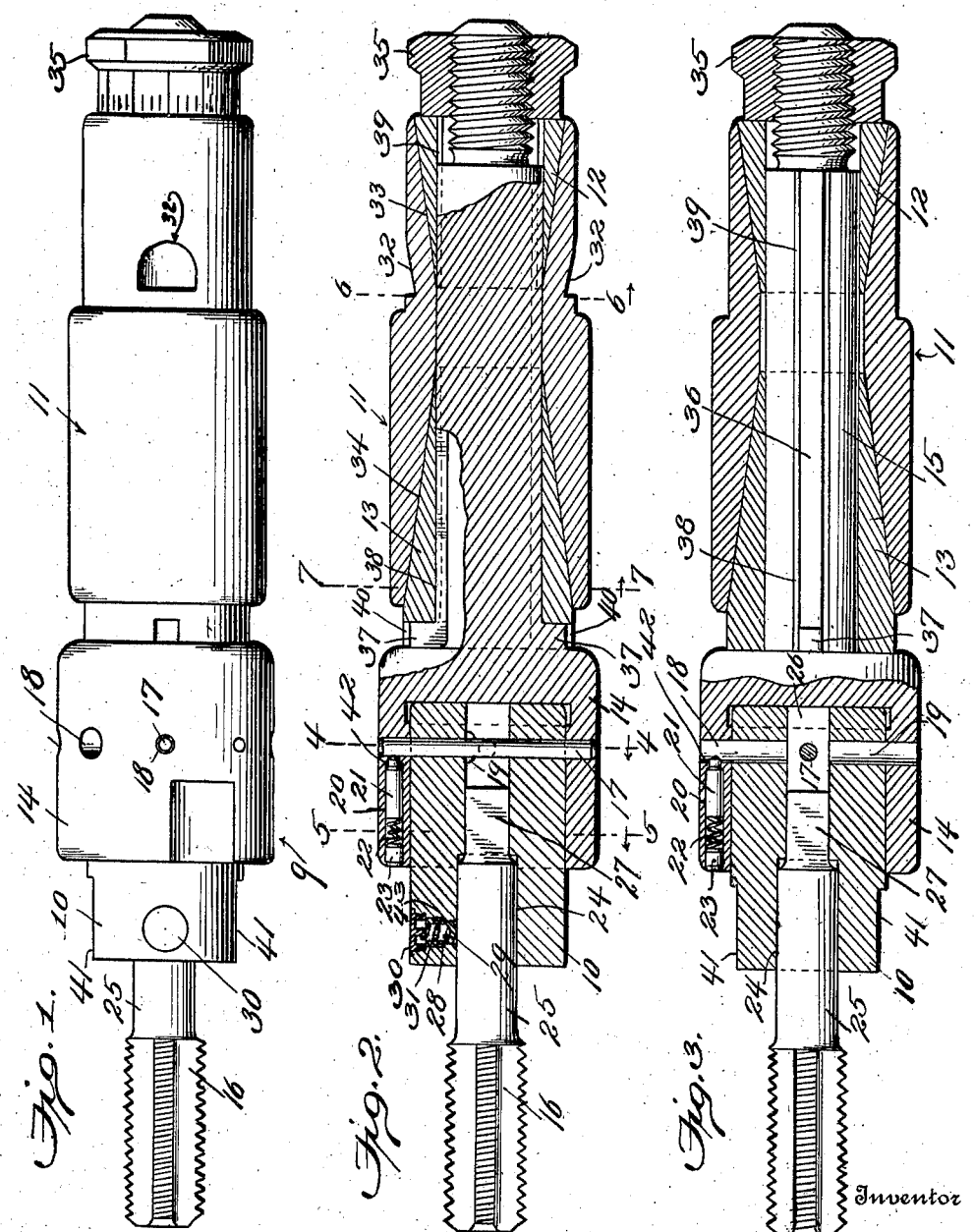

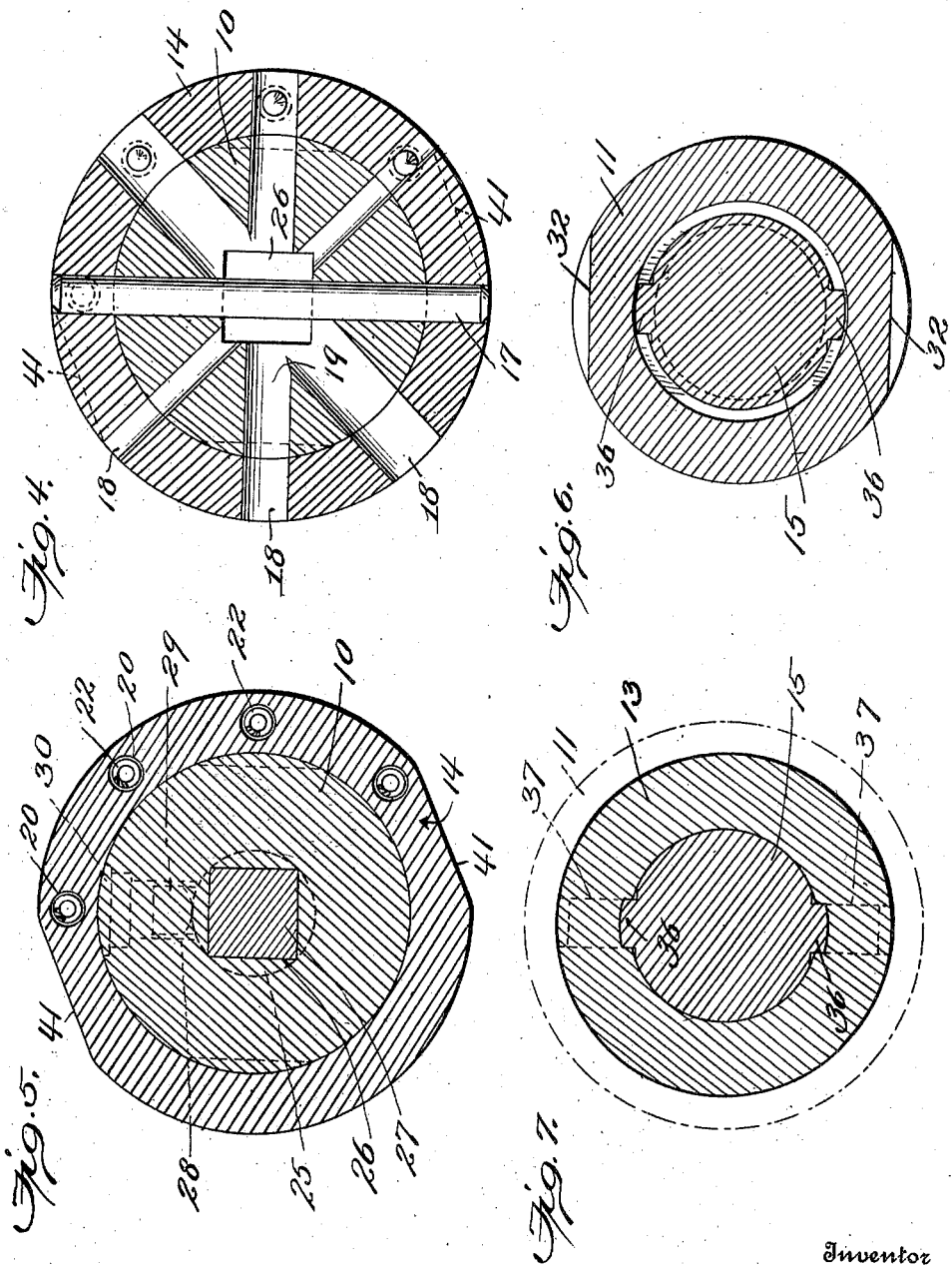

JERE C. DUFRESNE, OF NEWARK, NEW JERSEY.

TAP-CHUCK.

1,315,100.   Specification of Letters Patent.   Patented Sept. 2, 1919.

Application filed March 19, 1918. Serial No. 223,362.

*To all whom it may concern:*

Be it known that I, JERE C. DUFRESNE, a citizen of the United States, residing at Newark, in the county of Essex and State of New Jersey, have invented new and useful Improvements in Tap-Chucks, of which the following is a specification.

The present invention has reference to tap chucks, and it proposes, briefly, certain hereinafter - described improvements applicable both to drilling or cutting implements of the particular character specified and to other and analogous types as well; the improvements in question embodying primarily a specially - devised, frictional drive for the chuck, and a severable connection between the socket portion of the latter and the collet, the arrangement being such that this connecting device will shear off when the torsion exerted upon the chuck reaches a predetermined degree, thereby uncoupling the collet from the chuck and, consequently, avoiding breakage of the tap or other cutting tool which is fitted to the bore of the collet.

As is generally understood, it is usual for the tap to stick at comparatively frequent intervals during the cutting of a thread; and when that happens, the operator runs the tap backward a turn or two so as to loosen the chips, and then runs the tap forward again until a further sticking occurs. At such times, there is always a danger of the tap breaking before it can be retracted, especially if its stoppage be abrupt and the chuck be driven at a high speed. According to my invention, however, this danger is entirely prevented, because of the fact that the frictional engagement between the chuck and the driving members can be so regulated that the connecting device will break before the tap will be affected by the torsion; the same arrangement serving to indicate both when the tap becomes dull and when it sticks.

The invention also resides in the provision of spring-actuated detents in connection with the tap or other cutting tool and with the severable connecting device; a plurality of supporting openings for the latter being provided so that it is possible to interchangeably employ connecting devices of different diameters and, hence, of different degrees of resistance, according to the character of work to be performed.

An embodiment of the invention is illustrated in the accompanying drawing, wherein:—

Figure 1 is a side elevation of the improved tap chuck.

Figs. 2 and 3 are longitudinal sections taken at right angles to each other.

Figs. 4 to 7 are enlarged cross-sections taken on the correspondingly numbered lines in Fig. 2.

Referring more particularly to said drawings, the chuck is shown as comprising the following main parts or elements, to wit: the chuck body 9, the collet 10, and the driving sleeve 11, the last-mentioned element forming one member of the friction drive, which also includes a pair of reversely-arranged cones 12 and 13. The chuck body 9 embodies, in turn, a tubular, or substantially tubular, socket 14 and an axial stem or shank 15, the former having removably fitted therein the aforesaid collet 10, which carries the tap 16 or other cutting tool, and is coupled to the socket 14 by means of the severable connecting device 17.

In the construction illustrated, which may be regarded for all present purposes as preferred, the connecting device has the form of an elongated cylindrical pin, the ends of which are seated in pairs of openings 18 formed through the wall of the socket, and registering with the ends of diametrical passages 19 in the collet. In practice, there are several of these passages 19, which, as shown, intersect one another at the bore of the collet and are of different diameters, to receive shearing pins of different thicknesses, the openings 18 having the same diameter as the confronting ends of the corresponding passages, as will be understood. One opening 18 of each pair is intersected by the inner end of a longitudinal passage 20 which is formed in the wall of the socket and opens at its outer end through the edge face thereof; the passages 20 being designed to receive plunger detents 21 whose inner ends are reduced and beveled or pointed, as shown, and whose outer ends are acted upon by small coil springs 22. The latter are confined in said passages by closure blocks or plugs 23, driven into the outer ends of the passages, the springs 22 tending to force the pointed ends of the detents into the openings 18, so that one of the detents will engage the adjacent end of the shearing pin, irrespective of what passage 19 the pin is inserted through.

The bore of the collet is of two cross-sectional shapes, as shown, the outer portion 24 being cylindrical so as to receive the shank 25 of the tap, while the rear or inner portion 26 is rectangular and is designed to receive the tang 27 on the shank end. The passages 19 for the shearing pin are here represented as formed through the inner or rear portion of the collet; but since the latter is removable from the socket 14 and has a true cylindrical shape, said passages may be formed through the other end of the collet so as to intersect the cylindrical portion 26 of the bore, in which case the collet will be reversed end for end on being fitted in the socket, so that the tank portion 27 only of the tap shank will be inserted in the bore of the collet, thus permitting the entire length of the tap to be utilized. The tap is held in place in the collet by a device in the nature of a spring detent, which works in an opening 28 formed transversely through the collet, and, as represented, is adapted to engage the shank of the tap. Where the collet is intended to be reversible, however, the opening for the detent will be formed through the collet adjacent the other end thereof; or, if preferred, there may be one of these openings adjacent each end of the collet, and there may likewise be a set of the pin-receiving passages 19 at each end thereof, illustration of these features being omitted as involving merely a duplication of the present showing. In any case, however, this detent device may advantageously comprise an inner, tubular member or plunger 29 and an outer cap-like member 30, the two members having interposed between them an expansible coil spring 31 which acts to force the plunger against the tap. Both the passages 20 and the openings 28 are formed with shoulders 42 and 43 to limit the movement of the plungers 21 and 29.

The improved driving system with which the implement is provided, consists, as will be understood, of the two cones 12 and 13 and the sleeve 11, the latter being driven by a suitable driving element (not shown) from a source of power, and having its rear portion formed with a pair of diametrically-opposite flats 32 for engagement by the usual pins or teeth on the driving element. The two cones 12 and 13 are hollow, and are designed to fit over the shank 15 and to frictionally engage the conical surfaces 33 and 34 provided interiorly of the sleeve 11, and they are forced into such engagement by means of a nut 35 that is threaded on the projecting end of the said shank and has the end face of its body abutting against the base of the cone 12, the wall of said body being graduated so as to facilitate the adjustment of the nut and, hence, the extent or degree of frictional engagement.

The rotary movement of the sleeve 11 is transmitted from the cones to the chuck body through the agency of a pair of longitudinal keys 36 which are formed on and extend along the shank 15 and have their ends 37 turned outwardly across and integrally connected to the rear wall of the socket 14 at the points where they meet the same. These keys are designed to fit in keyways 38 and 39, formed in the inner surfaces of the cones 13 and 12, respectively, the front ends 40 of the keyways 38 being extended laterally across the front face or base of the cone 13 to receive the out-turned ends 37 of the keys. This construction of keys and keyways has the obvious effect of strengthening the chuck body as a whole and providing a direct and powerful connection between the latter and the cones, both parts of the chuck body being engaged by the front cone 12, while the shank part only is engaged by the rear cone 13.

The chuck is initially set by holding the collet 10 against rotation, and tightening the nut 35 to increase the frictional engagement between the cones 12 and 13 and the sleeve 11, the said collet being provided with oppositely-located flats 41 which enable it to be gripped by a wrench or other tool. When the nut 35 has been sufficiently tightened and continued torsion is applied or excessively imposed on the nut, the said nut, the cones 12 and 13, sleeve 11 and chuck body 14 all rotate together as a unit and shear the pin 18 because the predetermined resistance of the said pin to shearing is overcome. The pin 18 is, therefore, a contributing element in the operation of the chuck, particularly in certain classes of work, or when different sizes of holes are to be tapped. The improved friction devices indicate when the tap or tool is stuck, and the said pin serves to indicate when the friction of the friction devices is too tight and breaks before injury to a stuck tool or tap ensues.

What I claim is:

1. The combination with a chuck body comprising a socket and a shank, of operatively opposed friction devices keyed to said shank and having outer cone faces, one of the said devices being longitudinally adjustable, and a sleeve closely encircling said friction devices and in frictional driving engagement with the same.

2. The combination with a chuck body comprising a socket and a shank, of reversely inclined friction devices keyed to said shank, a sleeve encircling said friction devices and having inner frictional faces corresponding to the contour of said devices and in frictional engagement with the latter, and means coöperating with one of said devices for longitudinally adjusting the same to modify the degree of frictional engagement between the said devices and the sleeve.

3. The combination, with a chuck body comprising a socket and a shank; of a pair of friction cones keyed to said shank in end-to-end relation with their cone surfaces in reverse positions; and a sleeve encircling said cones and in frictional driving engagement with the cones.

4. The combination, with a chuck body comprising a socket and a shank; of a pair of friction cones keyed to said shank in end-to-end relation with their cone surfaces in reverse positions; a sleeve encircling said cones and in frictional engagement with the same; and means engaging one end of one of said cones for regulating the degree of such engagement.

5. The combination, with a chuck body comprising a socket and a shank having a pair of longitudinal keys thereon, said keys having out-turned ends extending across and connected to said socket; of a friction member fitted on said shank and having keyways to receive said keys, said keyways being extended across the adjacent end of said friction member to receive the out-turned ends of said keys; and a sleeve encircling said friction member and in frictional driving engagement with the same.

6. The combination, with a chuck body comprising a socket and a shank having a pair of longitudinal keys thereon, said keys having out-turned ends extending across and connected to said socket; of a pair of friction cones fitted on said shaft and having keyways to receive said keys, the keyways on the cone adjacent the socket being extended across the base of said cone to receive the out-turned ends of said keys; and a sleeve encircling said cones and in frictional driving engagement with the same.

7. The combination, with a chuck body comprising a socket and a shank having a pair of longitudinal keys thereon, said keys having out-turned ends extending across and connected to said socket; of a pair of friction cones fitted on said shaft and having keyways to receive said keys, the keyways on the cone adjacent the socket being extended across the base of said cone to receive the out-turned ends of said keys; a sleeve encircling said cones and in frictional driving engagement with the same; and means for adjusting said cones relatively to said sleeve to vary the degree of such engagement.

8. The combination of a chuck body comprising a socket having its side wall formed with a plurality of pairs of oppositely located transverse openings, and with a longitudinal passage for one opening of each pair communicating at its inner end with the said one opening and also extending fully outwardly through the edge of the said socket side wall, a collet removably fitted in said socket and having a tool receiving bore and a plurality of diametrical openings intersecting said bore and registering at their outer ends with the transverse openings of the side wall of the socket, a shearing pin inserted through one of the collet diametrical openings and having its opposite ends projecting into the corresponding pair of openings in registration with the openings of the socket wall, and a spring actuated plunger fitted in each socket passage and projecting at its inner end into the adjacent transverse opening of the socket to directly bear against one end of the said pin and operating to automatically engage said pin.

9. The combination of a chuck body comprising a socket having its side wall formed with a plurality of pairs of oppositely located transverse openings, and with a longitudinal passage for one opening of each pair communicating at its inner end with the said one opening and also extending fully outwardly through the edge of the said socket side wall, a collet removably fitted in said socket and having a tool receiving bore and a plurality of diametrical openings intersecting said bore and registering at their outer ends with the transverse openings at the side wall of the socket, a shearing pin inserted through one of the collet diametrical openings and having its opposite ends projecting into the corresponding pair of openings in registration with the openings of the socket wall, a spring actuated plunger fitted in each socket wall and projecting at its inner end into the adjacent transverse opening of the socket to directly bear against one end of the said pin and operating to automatically engage said pin, the collet also having at its outer end a transverse opening, and a spring controlled detent fitted in the said transverse opening at the outer end of the collet, the detent impinging at its inner end against the cutting tool within the collet.

In testimony whereof I have hereunto set my hand in presence of two subscribing witnesses.

JERE C. DUFRESNE.

Witnesses:
ABBIE C. DUFRESNE,
HARRY A. KELLOGG.